US012682843B2

(12) United States Patent
Jung

(10) Patent No.: US 12,682,843 B2
(45) Date of Patent: Jul. 14, 2026

(54) DISPLAY DEVICE HAVING FIRST AND SECOND SWITCHES CONTROLLING FIRST AND SECOND DRIVING POWER SOURCES RESPECTIVELY AND METHOD OF DRIVING THE SAME

(71) Applicant: Samsung Display Co., LTD., Yongin-si (KR)

(72) Inventor: Ha Yong Jung, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/427,965

(22) Filed: Jan. 31, 2024

(65) Prior Publication Data

US 2024/0428732 A1 Dec. 26, 2024

(30) Foreign Application Priority Data

Jun. 21, 2023 (KR) ........................ 10-2023-0079708

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2310/061* (2013.01); *G09G 2310/08* (2013.01); *G09G 2320/029* (2013.01)

(58) Field of Classification Search
CPC ............... G09G 3/3233; G09G 3/3291; G09G 2310/061; G09G 2310/08; G09G 2320/029; G09G 3/32; G09G 5/377; G09G 3/3266; G01R 31/44; H03K 17/302
See application file for complete search history.

(56) References Cited

U.S. PATENT DOCUMENTS

| | | | |
|---|---|---|---|
| 9,111,489 B2 | 8/2015 | Park et al. | |
| 9,111,491 B2 | 8/2015 | Woo et al. | |
| 9,378,673 B2 | 6/2016 | Oh et al. | |
| 10,304,391 B2 | 5/2019 | Ge et al. | |
| 2014/0176400 A1* | 6/2014 | Park | G09G 3/3233 345/76 |

(Continued)

FOREIGN PATENT DOCUMENTS

| | | |
|---|---|---|
| KR | 101492694 B1 | 2/2015 |
| KR | 101946503 B1 | 2/2019 |

(Continued)

*Primary Examiner* — Richard J Hong
(74) *Attorney, Agent, or Firm* — CANTOR COLBURN LLP

(57) ABSTRACT

A display device includes: pixels connected to scan lines, data lines, and sensing lines; a power supply which supplies a first driving power source to a first power line, supplies a second driving power source to a second power line, and supplies a third driving power source to a third power line; first switches located on pixel rows, respectively; and second switches located on the pixel rows, respectively. A first switch located on an i-th (i is a natural number) pixel row is connected between pixels located on the i-th pixel row and the first power line, and a second switch located on the i-th pixel row is connected between the pixels located on the i-th pixel row and the second power line. The first switch and the second switch, which are located on the i-th pixel row, are alternately turned on and turned off.

17 Claims, 11 Drawing Sheets

(56) References Cited

U.S. PATENT DOCUMENTS

| | | | | |
|---|---|---|---|---|
| 2014/0176525 | A1* | 6/2014 | Woo | G09G 3/3233 345/212 |
| 2019/0005883 | A1* | 1/2019 | Kim | G09G 3/3233 |
| 2019/0096335 | A1* | 3/2019 | Kim | G09G 3/3291 |
| 2020/0051499 | A1* | 2/2020 | Chung | G09G 5/377 |
| 2020/0160776 | A1* | 5/2020 | Lee | G09G 3/32 |
| 2021/0358418 | A1* | 11/2021 | Shin | G09G 3/3291 |
| 2022/0036813 | A1* | 2/2022 | Hwang | G09G 3/3233 |
| 2022/0103169 | A1* | 3/2022 | Ismail | H03K 17/302 |
| 2022/0335866 | A1* | 10/2022 | Lee | G09G 3/3291 |
| 2023/0215382 | A1* | 7/2023 | Hong | G09G 3/3233 345/214 |
| 2023/0215387 | A1* | 7/2023 | Hong | G09G 3/3233 345/204 |

FOREIGN PATENT DOCUMENTS

| | | |
|---|---|---|
| KR | 102027169 B1 | 10/2019 |
| KR | 102033374 B1 | 10/2019 |

* cited by examiner

DISPLAY DEVICE HAVING FIRST AND SECOND SWITCHES CONTROLLING FIRST AND SECOND DRIVING POWER SOURCES RESPECTIVELY AND METHOD OF DRIVING THE SAME

The application claims priority to Korean patent application No. 10-2023-0079708, filed on Jun. 21, 2023, and all the benefits accruing therefrom under 35 U.S.C. § 119, the content of which in its entirety is herein incorporated by reference.

BACKGROUND

1. Field

The disclosure generally relates to a display device and a method of driving the display device.

2. Related Art

With the development of information technologies, the importance of a display device which is a connection medium between a user and information increases. Accordingly, display devices, such as a liquid crystal display device and an organic light emitting display device, are widely used in various fields.

Pixels of a display device may be degraded corresponding to a use time, a display luminance, or the like, and accordingly, correction (grayscale correction) of data may be desired. An external compensation method may be used to correct data, corresponding to a characteristic of the pixels.

SUMMARY

In display device using an external compensation method for correcting data corresponding to a characteristic of pixels to compensate degraded pixels, a characteristic of the pixels is sensed during a separate sensing period, and data is corrected using sensing data corresponding to the characteristic of the pixels. When a voltage of a driving power source, which is supplied to the pixels during the sensing period, is not constant, the characteristic of the pixels is not accurately sensed, and therefore, the reliability of compensation may be deteriorated.

Embodiments provide a display device and a method of driving the same, which enables a voltage of a driving power source to be constantly maintained during a sensing period of pixels.

In accordance with an embodiment of the disclosure, a display device includes: pixels connected to scan lines, data lines, and sensing lines; a power supply which supplies a first driving power source to a first power line, supplies a second driving power source to a second power line, and supplies a third driving power source to a third power line; first switches located on pixel rows, respectively, and second switches located on pixel rows, respectively, where a first switch located on an i-th pixel row among the first switches is connected between pixels located on the i-th pixel row and the first power line, and a second switch located on the i-th pixel row among the second switches is connected between the pixels located on the i-th pixel row and the second power line, where i is a natural number, and where the first switch and the second switch, which are located on the i-th pixel row, are alternately turned on and turned off.

In an embodiment, during a display period in which an image is displayed by the pixels, the first switches may be turned on, and the second switches may be turned off.

In an embodiment, the display period may be an active period included in one frame period.

In an embodiment, during a sensing period in which the pixels located on the i-th pixel row are sensed, the first switch located on the i-th pixel row may be turned off, and the second switch located on the i-th pixel row may be turned on.

In an embodiment, the sensing period may include a first period in which sensing data is sensed corresponding to a sensing voltage from the pixels located on the i-th pixel row and a second period in which a data signal before the sensing period is re-supplied.

In an embodiment, the power supply may supply the second driving power source to the second power line during the sensing period, and set the second power line to a floating state during the display period.

In an embodiment, during the sensing period in which the pixels located on the i-th pixel row are sensed, first switches located on the other pixel rows except the i-th pixel row may be set to a turn-on state, and second switches located on the other pixel rows may be set to a turn-off state.

In an embodiment, the sensing period may be a vertical blank period included in one frame period.

In an embodiment, The display device may further include: a data driver which supplies a data signal to the data lines during the display period, and supplies a voltage of a reference power source to the data lines during the sensing period; a scan driver which supplies a scan signal to the scan lines; a sensing unit connected to sensing lines, where the sensing unit may generate sensing data, corresponding to a sensing voltage supplied from the pixels located on the i-th pixel row during the sensing period in which the pixels located on the i-th pixel row are sensed; and a timing controller which generates output data by correcting input data input from an outside, using the sensing data.

In an embodiment, the timing controller may control turn-on and turn-off of the first switches and the second switches by supplying a switch control signal thereto.

In accordance with an embodiment of the disclosure, a display device includes: pixels connected to scan lines, data lines, and sensing lines, where each of the pixels includes a first switch and a second switch; and a power supply which supplies a first driving power source to a first power line, supplies a second driving power source to a second power line, and supplies a third driving power source to a third power line, where the first switch included in each of the pixels is connected to the first power line, and the second switch included in each of the pixels is connected to the second power line, and wherein, during a display period in which the pixels display an image, the first switch included in each of the pixels is in a turn-on state, and the second switch included in each of the pixels is in a turn-off state.

In an embodiment, during a sensing period in which pixels located on an i-th pixel row are sensed, the first switch included in each of pixels located on the i-th pixel row may be in a turn-off state, and the second switch included in each of the pixels located on the i-th pixel row may be in a turn-on state, where i is a natural number.

In an embodiment, the display period may be an active period included in one frame period, and the sensing period may be a vertical blank period included in the one frame period.

In an embodiment, the power supply may supply the second driving power source to the second power line during the sensing period, and set the second power line to a floating state during the display period.

In an embodiment, the display device may further include: a data driver which supplies a data signal to the data lines during the display period, and supplies a voltage of a reference power source to the data lines during the sensing period; a scan driver which supplies a scan signal to the scan lines; a sensing unit which generates sensing data, corresponding to a sensing voltage supplied from the pixels located on the i-th pixel row during the sensing period; and a timing controller which generates output data by correcting input data input from an outside, using the sensing data.

In an embodiment, the timing controller may control turn-on and turn-off of the first switch and the second switch by supplying a switch control signal thereto.

In accordance with an embodiment of the disclosure, a method of driving a display device includes: supplying a voltage of a first driving power source to a driving transistor included in each of pixels via a first power line during a display period; and supplying a voltage of a second driving power source different from the first driving power source to the driving transistor included in each of the pixels via a second power line during a sensing period.

In an embodiment, the second power line may be set to a floating state during the display period.

In an embodiment, the display period may be an active period included in one frame period, and the sensing period may be a vertical blank period included in the one frame period.

In an embodiment, the method may further include: generating output data by correcting input data, corresponding to sensing data generated from the pixels during the sensing period; and generating a data signal using the output data, and supplying the data signal to the pixels during the display period.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
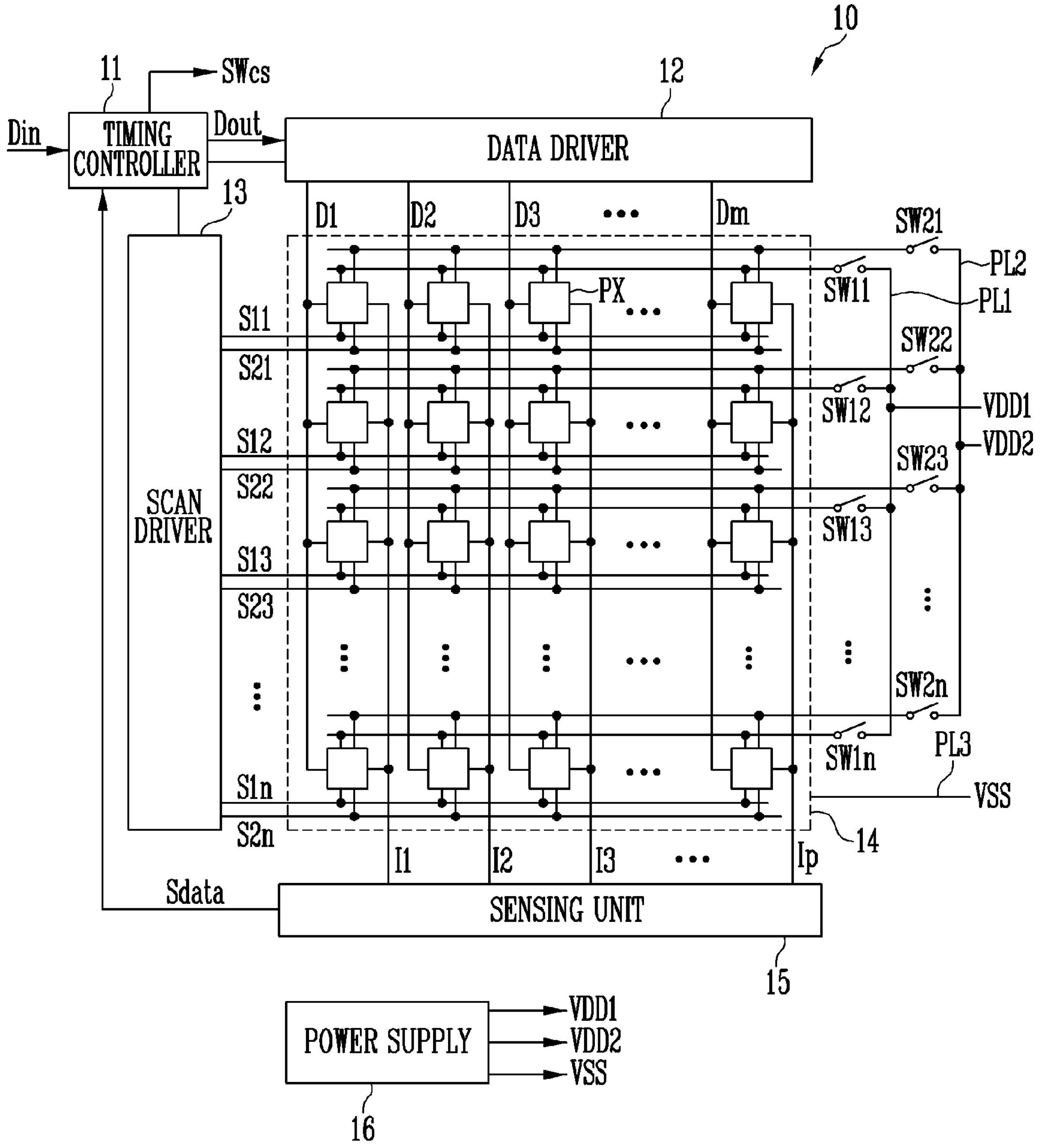
FIG. 1 is a diagram illustrating a display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

A part irrelevant to the description will be omitted to clearly describe the disclosure, and the same or similar constituent elements will be designated by the same reference numerals throughout the specification.

In addition, the size and thickness of each component illustrated in the drawings are arbitrarily shown for better understanding and ease of description, but the disclosure is not limited thereto. Thicknesses of several portions and regions are exaggerated for clear expressions.

It will be understood that when an element is referred to as being "on" another element, it can be directly on the other element or intervening elements may be present therebetween. In contrast, when an element is referred to as being "directly on" another element, there are no intervening elements present.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the disclosure. Also, in some embodiments, the blocks, the units, and/or the modules may be physically separated into more complex blocks, more complex units, and/or more complex modules without departing from the scope of the disclosure.

The term "connection" between two components may include both electrical connection and physical connection, but the disclosure is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the disclosure.

The terminology used herein is for the purpose of describing particular embodiments only and is not intended to be limiting. As used herein, "a", "an," "the," and "at least one"

do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The disclosure is not limited to embodiments disclosed below, and may be implemented in various forms. Each embodiment disclosed below may be independently embodied or be combined with at least another embodiment prior to being embodied.

FIG. 1 is a diagram illustrating a display device in accordance with an embodiment of the disclosure.

Referring to FIG. 1, the display device 10 in accordance with an embodiment of the disclosure may include a timing controller 11, a data driver 12, a scan driver 13, a pixel unit 14, a sensing unit 15, and a power supply 16.

The timing controller 11 may receive input data Din corresponding to each frame and control signals from an external processor. The processor may include at least one selected from a graphics processing unit (GPU), a central processing unit (CPU), an application processor (AP), and the like.

The timing controller 11 may generate output data Dout by correcting the input data Din, and supply the output data Dout to the data driver 12. The timing controller 11 may be supplied with sensing data Sdata from the sensing unit 15, and correct the input data Din, using the sensing data Sdata, thereby generating the output data Dout. Characteristic information (e.g., threshold voltage information and/or mobility information) of a driving transistor included in each of pixels PX may be included in the sensing data Sdata, and the timing controller 11 may generate the output data Dout by correcting the input data Din in a way such that a characteristic of the driving transistor included in each of the pixels PX is compensated using the sensing data Sdata.

In an embodiment, the timing controller 11 may correct the input data Din in a way such that degradation of a light emitting element included in each of the pixels PX can be compensated. Also, the timing controller 11 may correct the input data Din by reflecting an optical measurement result measured in a processing process. Also, the timing controller 11 may provide control signals suitable for specifications of each of the data driver 12, the scan driver 13, and the sensing unit 15.

During a display period, the data driver 12 may generate a data signal (or data voltage) to be supplied to data lines D1 to Dm ("m" is a natural number), corresponding to the output data Dout and the control signals, which are supplied from the timing controller 11. The data driver 12 may supply the data signal to the data lines D1 to Dm in units of pixel rows (or horizontal lines). The pixel row may mean a position of pixels PX connected to a same scan line or arranged in an extending direction of the same scan line.

In an embodiment, for example, the data signal supplied to the data lines D1 to Dm may be supplied to pixels PX selected by a first scan signal. In such an embodiment, the data driver 12 may supply the data signal to the data lines D1 to Dm to be synchronized with the first scan signal.

During a sensing period, the data driver 12 may supply a voltage of a reference power source to the data lines D1 to Dm. The voltage of the reference power source may be set to a voltage at which the driving transistor included in each of the pixels PX can be turned on.

The scan driver 13 may supply the first scan signal to first scan lines S11, S12, S13, . . . , and S1*n* ("n" is a natural number) and supply a second scan signal to second scan lines S21, S22, S23, . . . , and S2*n*), corresponding to control signals from the timing controller 11.

In an embodiment, for example, the scan driver 13 may sequentially supply the first scan signal having a gate-on voltage (or turn-on level) to the first scan lines S11 to Sin. Also, the scan driver 13 may sequentially supply the second scan signal having a gate-on voltage (or turn-on level) to the second scan lines S21 to S2*n*. In an embodiment, as shown in FIG. 1, the display device 10 may include a single scan driver 13 to drive the first scan lines S11 to Sin and the second scan lines S21 to S2*n*. However, the disclosure is not limited thereto. In an alternative embodiment, for example, the scan driver 13 may be provided in plural, and the first scan lines S11 to Sin and the second scan lines S21 to S2*n* may be respectively supplied with scan signals from different scan drivers.

During the display period, when the first scan signal and the second scan signal are sequentially supplied to the pixels PX, the pixels PX are selected in units of pixel rows. The pixels PX selected during the display period may be supplied with a data signal, and generate light with a predetermined luminance, corresponding to the data signal.

During the sensing period, the first scan signal and the second scan signal are supplied to at least one specific pixel row, so that pixels located on the specific pixel row (i.e., pixels to be sensed) are selected. During the sensing period, the sensing unit 15 may supply a voltage of an initialization power source to a sensing line located on the specific pixel row, or receive a sensing voltage (or sensing information) from pixels connected to the sensing line located on the specific pixel row.

Threshold voltage information of the driving transistor may be included in the sensing voltage. Mobility information of the driving transistor may be included in the sensing voltage. Degradation information of the light emitting element may be included in the sensing voltage. The sensing unit 15 may be supplied with a sensing voltage from pixels PX, and generate sensing data Sdata, using the sensing voltage. The sensing data Sdata may be supplied to the timing controller 11.

During the display period, the sensing unit 15 may supply the voltage of the initialization power source to sensing line I1 to Ip ("p" is a natural number). During the sensing period, the sensing unit 15 may supply the voltage of the initialization power source to sensing lines located on at least one specific pixel row. During another period, the sensing unit 15 may receive a sensing voltage from pixels located on the specific pixel row.

The pixel unit 14 includes pixels PX. Each of the pixels PX may include a plurality of transistors and at least one light emitting element. Pixels PX may be selected when a scan signal is supplied to a scan line connected thereto to be supplied with a data signal from a data line connected thereto. Each of the pixels PX supplied with the data signal may supply light with a predetermined luminance to the outside, corresponding to the data signal.

Each of the pixels PX may be connected to a first power line PL1 or a second power line PL2. Also, each of the pixels PX may be connected to a third power line PL3.

During the display period, the pixels PX may be connected to the first power line PL1 and the third power line PL3. The pixels PX may be supplied with a first driving power source VDD1 through the first power line PL1, and be supplied with a third driving power source VSS through the third power line PL3. The first driving power source VDD1 may be set to a voltage level higher than a voltage level of the third driving power source VSS.

During the sensing period, pixels located on at least one specific pixel row may be connected to the second power line PL2 and the third power line PL3. The pixels located on the specific pixel row may be supplied with a second driving power source VDD2 through the second power line PL2, and be supplied with the third driving power source VSS through the third power line PL3. The second driving power source VDD2 may be set to a voltage level higher than the voltage level of the third driving power source VSS.

In an embodiment, the pixels PX may be supplied with the first driving power source VDD1 during the display period, and pixels located on at least one specific pixel row may be supplied with the second driving power source VDD2 during the sensing period. In an embodiment, the first driving power source VDD1 and the second driving power source VDD2 may be set to a same voltage as each other or different voltages from each other. When the second driving power source VDD2 is supplied during the sensing period, sensing data Sdata, on which a characteristic of the pixels PX is reflected, may be generated with improved accuracy, and accordingly, the reliability of compensation can be ensured.

This will hereinafter be described in detail. During the display period, the first power line PL1 supplied with the first driving power source VDD1 may be commonly connected to the pixels PX. The first driving power source VDD1 may supply a predetermined driving current to pixels PX connected thereto. An amount of the driving current may be determined corresponding to a data signal supplied to each of the pixels PX, and be differently set for each frame. When the amount of the driving current is differently set for each frame, a voltage drop of the first driving power source VDD1 may also be differently set for each frame. Also, the first power line PL1 supplied with the first driving power source VDD1 is commonly connected to the pixels PX, and accordingly, a voltage may be changed by noise from the pixels PX.

When pixels located on a specific pixel row are supplied with the first driving power source VDD1 during a blank period (or sensing period) between frames, a sensing voltage (or sensing data) generated from the pixels located on the specific pixel row may also have a predetermined deviation, corresponding the first driving power source VDD1.

The second driving power source VDD2 is connected to pixels located on a specific pixel row to be sensed, and any driving current is not supplied to the other pixels which display image. Any voltage drop does not occur (or is minimized) in the second driving power source VDD2, and accordingly, a constant voltage can be stably maintained. Also, the second driving power source VDD2 is connected to the pixels located on the specific pixel row (i.e., is not connected to the pixels located on the other pixel rows, which display the image) during the sensing period, and accordingly, influence of noise can be minimized.

Thus, in an embodiment, the second driving power source VDD2 is supplied to pixels located on a specific pixel row during a blank period (or sensing period) between frames, such that reliable sensing data Sdata on which a characteristic of the pixels is reflected can be generated with improved accuracy.

The power supply 16 may supply the first driving power source VDD1 to the first power line PL1, and supply the second driving power source VDD2 to the second power line PL2. Also, the power supply 16 may supply the third driving power source VSS to the third power line PL3. Each of the first driving power source VDD1 and the second driving power source VDD2 may be set to a voltage higher than a voltage of the third driving power source VSS.

In an embodiment, the power supply 16 may additionally generate various voltages in addition to the first driving power source VDD1, the second driving power source VDD2, and the third driving power source VSS. In an embodiment, for example, the power supply 16 may generate a gate-off voltage, a gate-on voltage, a gamma voltage, or the like, and supply the generated voltages to the display device 10.

The display device 10 in accordance with an embodiment of the disclosure may further include first switches SW11, SW12, SW13, . . . , and SW1*n* and second switches SW21, SW22, SW23, . . . , and SW2*n*.

The first switches SW11 to SW1*n* may be located on the pixel rows, respectively. A first switch SW1*i* (see FIG. 3) located on an i-th ("i" is a natural number) may be connected between pixels located on the i-th pixel row and the first power line PL1.

The second switches SW21 to SW2*n* may be located on the pixel rows, respectively. A second switch SW2*i* (see FIG. 3) located on the i-th pixel row may be connected between the pixels located on the i-th pixel row and the second power line PL2.

The first switches SW11 to SW1*n* and the second switches SW21 to SW2*n* may be turned on and turned off by a switch control signal SWcs supplied from the timing controller 11. The first switch SW1*i* and the second switch SW2*i*, which are located on the i-th pixel row, may be alternately turned on and turned off.

In an embodiment, during the display period, the first switches SW11 to SW1*n* may be turned on such that a voltage of the first driving power source VDD1 is supplied to the pixels PX. In an embodiment, during the sensing period, the first switch SW1*i* located on at least one specific pixel row to be sensed, e.g., the i-th pixel row may be turned off, and the second switch SW2*i* located on the i-th pixel row may be turned on. The pixels located on the i-th pixel row may be supplied with the second driving power source VDD2, and pixels located on the other pixel rows may be supplied with the first driving power source VDD1.

That is, during the sensing period, pixels located on a specific pixel row may be sensed, and the other (or the remaining) pixels except the pixels located on the specific pixel row may display a predetermined image, corresponding to a data signal.

Figure 2:
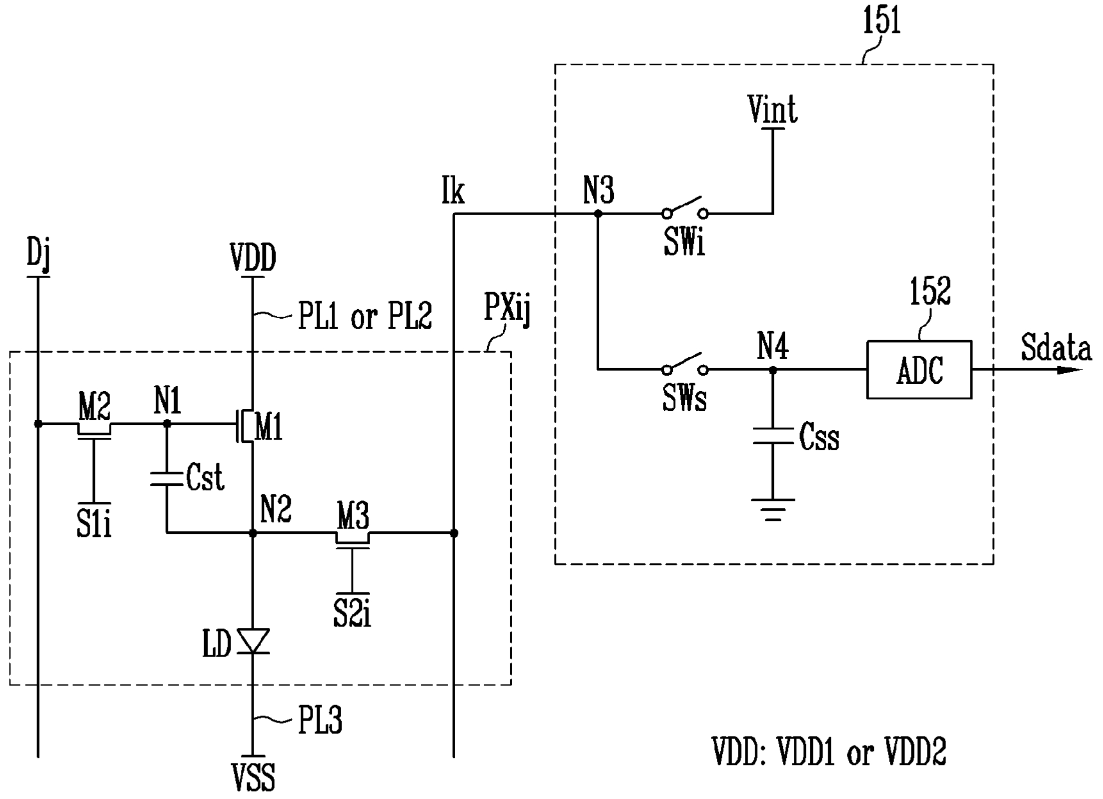
FIG. 2 is a diagram illustrating a pixel and a sensing channel in accordance with an embodiment of the disclosure.

FIG. 2 is a diagram illustrating a pixel and a sensing channel in accordance with an embodiment of the disclosure. In FIG. 2, a pixel PXij located on an i-th horizontal line (or an i-th pixel row) and a j-th vertical line (or a j-th pixel column) will be described ("j" is a natural number).

Referring to FIG. 2, the pixel PXij in accordance with an embodiment of the disclosure may include transistors M1 to M3, a storage capacitor Cst, and a light emitting element LD.

The light emitting element LD may be connected between a power line PL1 or PL2 to which a driving power source VDD is supplied and a third power line PL3. In an embodiment, for example, a first electrode (e.g., an anode electrode) of the light emitting element LD may be connected to a first power line PL1 or a second power line PL2 via a second node N2 and a first transistor M1, and a second electrode (e.g., a cathode electrode) of the light emitting element LD may be connected to the third power line PL3. The light emitting element LD may emit light with a luminance corresponding to an amount of driving current supplied from the first transistor M1.

Voltages of a first driving power source VDD1 and a third driving power source VSS, which are supplied during a display period, may have a predetermined potential difference such that the light emitting element LD can emit light. In an embodiment, for example, the first driving power source VDD1 may be a high-potential power source having a high voltage, and the third driving power source VSS may be a low-potential power source having a voltage lower than the voltage of the first driving power source VDD1.

Voltages of a second driving power source VDD2 and the third driving power source VSS, which are supplied during a sensing period, may have a predetermined potential difference such that a current corresponding to a reference power source can flow from the first transistor M1 to the second node N2. In an embodiment, for example, the second driving power source VDD2 may be a high-potential power source having a high voltage, and the third driving power source VSS may be a low-potential power source having a low voltage.

In an embodiment, the light emitting element LD may be an organic light emitting diode. Alternatively, the light emitting element LD may be an inorganic light emitting diode such as a micro LED (light emitting diode) or a quantum dot light emitting diode. Alternatively, the light emitting element LD may be an element configured with a combination of an organic material and an inorganic material. In an embodiment, as shown in FIG. 2, it each of the pixel PXij may include a single light emitting element LD. However, in another embodiment, the pixel PXij may include a plurality of light emitting elements, and the plurality of light emitting elements may be connected in series, parallel or series/parallel to each other.

In an embodiment, the transistors M1, M2, and M3 may be implemented with an N-type transistor. In an alternative embodiment, the transistors M1, M2, and M3 may be implemented with a P-type transistor. In another alternative embodiment, the transistors M1, M2, and M3 may be implemented with a combination of the N-type transistor and the P-type transistor. The transistor may be implemented in various forms such as a thin film transistor (TFT), a field effect transistor (FET), and a bipolar function transistor (BJT).

The first transistor M1 may be connected between the first power line PL1 or the second power line PL2 and the second node N2. In addition, a gate electrode of the first transistor M1 may be connected to a first node N1. During the display period, the first transistor M1 may control an amount of current supplied from the first driving power source VDD1 to the third driving power source VSS via the light emitting element LD, corresponding to a voltage of the first node N1. During the sensing period, the first transistor M1 may control an amount of current supplied from the second driving power source VDD2 to the second node N2, corresponding to the voltage of the first node N1. The first transistor M1 may be referred to as a driving transistor.

A second transistor M2 may be connected between a data line Dj and the first node N1. In addition, a gate electrode of the second transistor M2 may be connected to a first scan line S1*i*. The second transistor M2 may be turned on when a first scan signal is supplied to the first scan line (or an i-th first scan line) S1*i*, to electrically connect the data line (or a j-th data line) Dj and the first node N1 to each other. The second transistor M2 may be referred to as a switching transistor.

A third transistor M3 may be connected between the second node N2 and a sensing line (or a k-th sensing line) Ik ("k" is a natural number). In addition, a gate electrode of the third transistor M3 may be connected to a second scan line S2*i*. The third transistor M3 may be turned on when a second scan signal is supplied to the second scan line (or an i-th second scan line) S2*i*, to electrically connect the sensing line Ik and the second node N2 to each other. The third transistor M3 may be referred to as a sensing transistor.

The storage capacitor Cst may be connected between the first node N1 and the second node N2. The storage capacitor Cst may store a voltage corresponding to a voltage difference between the first node N1 and the second node N2.

A sensing channel 151 may include an initialization switch SWi, a sampling switch SWs, a sensing capacitor Css, and an analog-digital converter (hereinafter, referred to as an "ADC") 152.

The initialization switch SWi may be connected between a third node N3 connected to the sensing line Ik and an initialization power source Vint. The initialization switch SWi may be turned on or turned off, corresponding to a control signal supplied from the timing controller 11 to the sensing unit 15. When the initialization switch SWi is turned on, a voltage of the initialization power source Vint may be supplied to the sensing line Ik via the third node N3.

The sampling switch SWs may be connected between the third node N3 and a fourth node N4. The sampling switch SWs may be turned on or turned off, corresponding to a control signal supplied from the timing controller 11 to the sensing unit 15. When the sampling switch SWs is turned on, the third node N3 and the fourth node N4 may be electrically connected to each other.

A first electrode of the sensing capacitor Css may be connected to the fourth node N4, and a first electrode of the sensing capacitor Css may be connected to a base power source (e.g., a ground). The sensing capacitor Css may store a voltage of the fourth node N4.

The ADC 152 may be connected to the fourth node N4. The ADC 152 may generate sensing data Sdata by using a voltage (e.g., a sensing voltage) applied to the fourth node N4. The sensing data Sdata may include characteristic (threshold voltage and/or mobility) information of the first transistor M1.

In an embodiment, the ADC 152 may be located for each sensing channel 151. The sensing unit 15 may include ADCs 152 corresponding to a number of sensing channels 151. In an alternative embodiment, the ADC 152 may be located to be shared by (or be commonly connected to) a plurality of sensing channels 151. The ADC 152 may convert a sensing voltage of the plurality of sensing channels 151 by time-dividing the sensing voltage.

Figure 3:
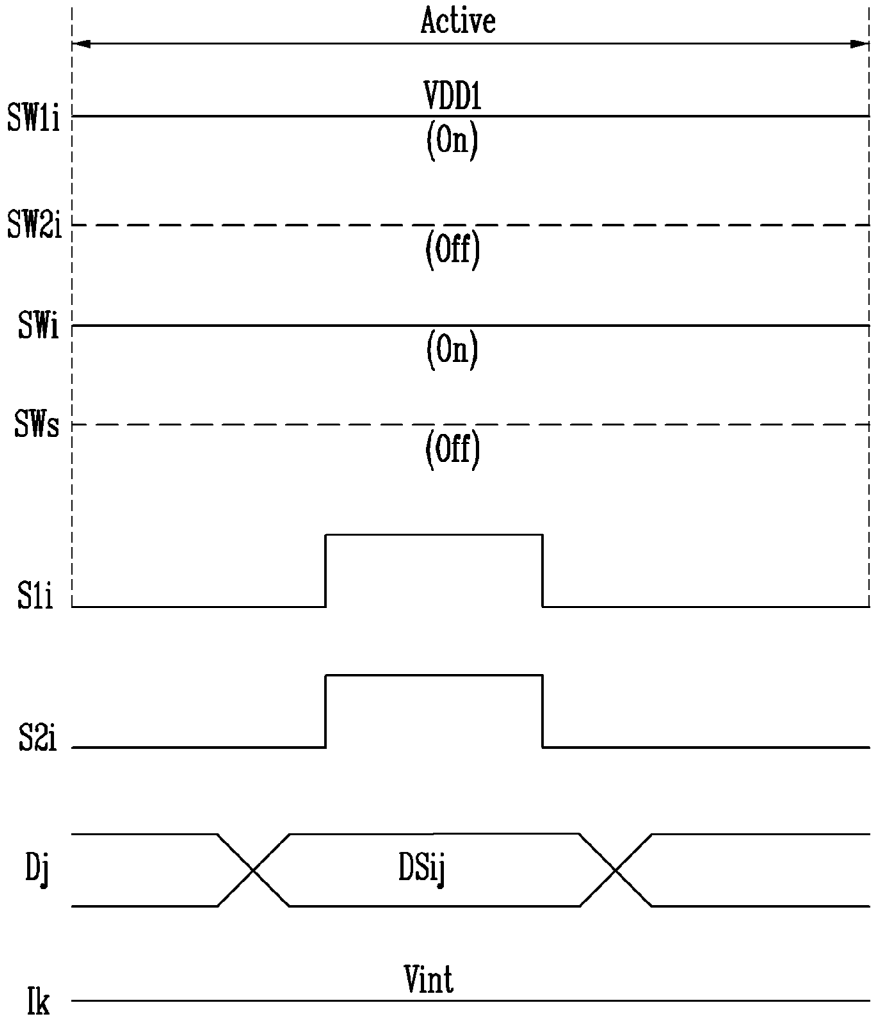
FIG. 3 is a waveform diagram illustrating an embodiment of a method of driving the pixel during a display period.
Figure 4:
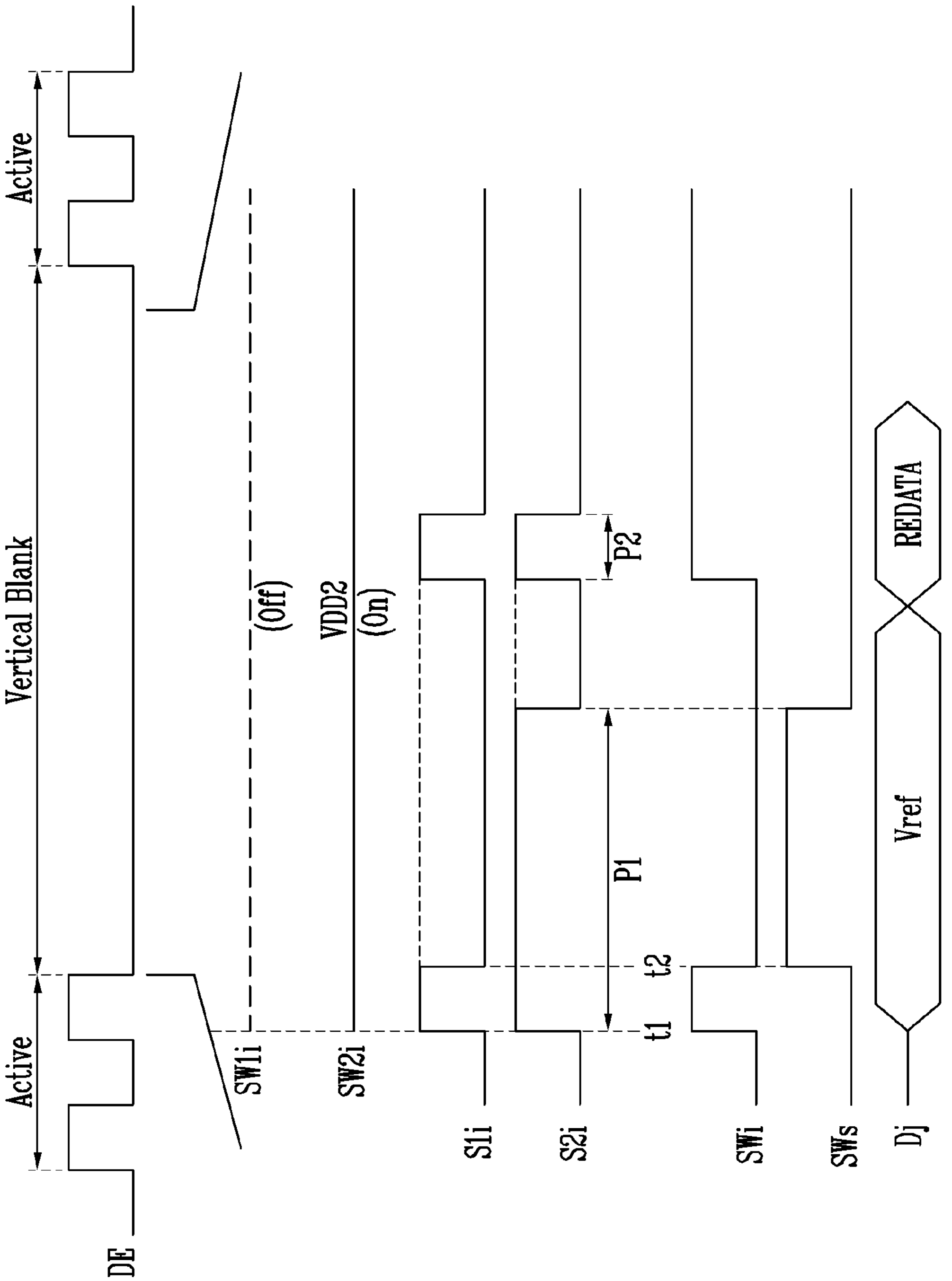
FIG. 4 is a waveform diagram illustrating an embodiment of a method of driving the pixel during a sensing period.

FIG. 3 is a waveform diagram illustrating an embodiment of a method of driving the pixel during a display period. FIG. 4 is a waveform diagram illustrating an embodiment of a method of driving the pixel during a sensing period.

Referring to FIGS. 3 and 4, in an embodiment, one frame period may include an active period Active and a vertical blank period Vertical Blank between adjacent active periods. In FIGS. 3 and 4, a data enable signal DE may define an active period during which a data signal is supplied. In an embodiment, for example, a period during which the data enable signal DE is supplied (supplied in a pulse form) may be defined as an active period, and a period during which the data enable signal DE is not supplied may be defined as a vertical blank period. The active period of the one frame may be set as a display period, and the vertical blank period of the one frame may be set as a sensing period.

Referring to FIG. 3, during the display period (i.e., the active period), the first switches SW11 to SW1*n* may be turned on, and the second switches SW21 to SW2*n* may be turned off. That is, during the display period, an i-th first switch SW1*i* located on an i-th pixel row may be turned on, and an i-th second switch SW2*i* located on the i-th pixel row may be turned off. When the i-th first switch SW1*i* is turned on, the pixel PXij may be connected to the first power line PL1, and accordingly be supplied with the first driving power source VDD1.

During the display period, the initialization switch Swi may be set to a turn-on state, and accordingly, the voltage of the initialization power source Vint may be supplied to the sensing line Ik. During the display period, the first scan signal may be supplied to the first scan line S1*i*, and the second scan signal may be supplied to the second scan line S2*i*.

When the first scan signal is supplied to the first scan line S1*i*, the second transistor M2 may be turned on. When the second transistor M2 is turned on, a data signal Dsij from the data line Dj may be supplied to the first node N1. When the second scan signal is supplied to the second scan line S2*i*, the third transistor M3 may be turned on. When the third transistor M3 is turned on, the voltage of the initialization power source Vint from the sensing line Ik may be supplied to the second node N2. A voltage corresponding to a difference between a voltage of the data signal Dsij and the voltage of the initialization power source Vint may be stored in the storage capacitor Cst.

After a voltage corresponding to the data signal Dsij is stored in the storage capacitor Cst, the second transistor M2 may be turned off as the supply of the first scan signal to the first scan line S1*i* is suspended, and the third transistor M3 may be turned off as the supply of the second scan signal to the second scan line S2*i* is suspended. Thereafter, the first transistor M1 may supply a driving current from the first driving power source VDD1 to the light emitting element LD, corresponding to the voltage stored in the storage capacitor Cst. A luminance of the light emitting element LD may be determined corresponding to an amount of driving current supplied from the first transistor M1 to the light emitting element LD.

Referring to FIG. 4, during the sensing period (i.e., the vertical blank period), sensing information may be extracted on (or obtained from) at least one specific pixel row. In an embodiment, for example, sensing information may be extracted from pixels located on the i-th pixel row (or at least one pixel located on the i-th pixel row). During the sensing period, the other pixels except the pixels located on the i-th pixel row, which are to be sensed, may display a predetermined image while being supplied with the first driving power source VDD1.

During the sensing period, the i-th first switch SW1*i* located on the i-th pixel row may be turned off, and the i-th second switch SW2*i* may be turned on. When the i-th second switch SW2*i* is turned on, the pixel PXij located on the i-th pixel row may be connected to the second power line PL2, and accordingly be supplied with the second driving power source VDD2.

The sensing period may be divided in a first period P1 and a second period P2. The first period P1 may be a period during which sensing data Sdata corresponding to a sensing voltage is generated, and the second period P2 may be a period during which data is re-written.

At a first time point t1 of the first period P1, the first scan signal may be supplied to the first scan line S1*i*, and the second scan signal may be supplied to the second scan line S2*i*. When the first scan signal and the second scan signal are supplied, the second transistor M2 and the third transistor M3 may be turned on.

When the second transistor M2 is turned on, a reference voltage Vref from the data line Dj may be supplied to the first node N1. The reference voltage Vref is a voltage at which the first transistor M1 can be turned on, and may be predetermined.

When the third transistor M3 is turned on, the voltage of the initialization power source Vint may be supplied to the second node N2. To this end, the initialization switch SWi may be set to the turn-on state during a period between the first time point t1 and a second time point t2. A voltage corresponding to a difference between the reference voltage Vref and the voltage of the initialization power source Vint may be charged in the storage capacitor Cst. Additionally, the supply of the voltage of the initialization power source Vint to the sensing line Ik may be suspended after the second time point t2.

After the second time point t2, the supply of the first scan signal may be suspended, and the supply of the second scan signal may be maintained. During the rest of the first period P1 after the second time point t2, the sampling switch SWs may be set to the turn-on state.

During the rest of the first period P1 after the second time point t2, the third transistor M3 may maintain the turn-on state. The first transistor M1 may supply a predetermined current from the second driving power source VDD2 to the second node N2, corresponding to the reference voltage Vref, and accordingly, a sensing voltage may be applied to the second node N2. The sensing voltage supplied to the second node N2 may be supplied to the sensing capacitor Css via the third node N3 and the sampling switch SWs.

The ADC 152 may convert the sensing voltage stored in the sensing capacitor Css into sensing data Sdata in a digital format, and supply the sensing data Sdata to the timing controller 11. Threshold voltage and mobility information of the first transistor T1 may be included in the sensing data Sdata. The second period P2 is a period in which a previous data signal is supplied to recover an image display state before the sensing period. In the second period P2, the initialization switch SWi may be turned on, and the sampling switch SWs may be turned off. When the initialization switch SWi is turned on, the voltage of the initialization power source Vint may be supplied to the sensing line Ik. During the second period P2, the first scan signal may be supplied to the first scan line S1*i*, and the second scan signal may be supplied to the second scan line S2*i*. When the first scan signal and the second scan signal are supplied, the second transistor M2 and the third transistor M3 may be turned on.

When the second transistor M2 is turned on, a voltage of a previous data signal REDATA may be supplied to the first node N1. When the third transistor M3 is turned on, the voltage of the initialization power source Vint may be supplied to the second node N2. A voltage corresponding to the previous data signal REDATA may be stored in the storage capacitor Cst. Thereafter, the pixel PXij may generate light with a luminance corresponding to the previous data signal REDATA.

As described above, in an embodiment of the disclosure, the first driving power source VDD1 is supplied to the pixels PX during the display period, and the second driving power source VDD2 is supplied to pixels located on at least one specific pixel row, which are to be sensed, during the sensing period. The second driving power source VDD2 has a low voltage drop and a low noise, as compared with the first driving power source VDD1. Thus, sensing data, on which a characteristic of the pixels is reflected, may be generated with improved accuracy during the sensing period, and accordingly, the reliability of compensation can be ensured.

Figure 5:
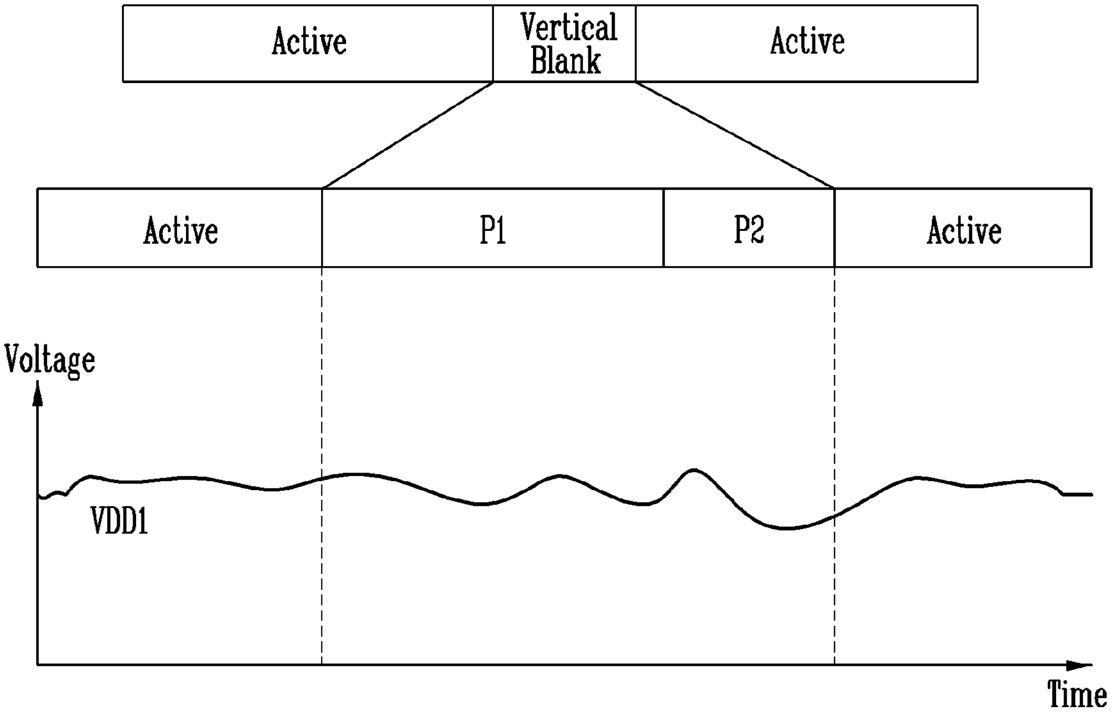
FIG. 5 is a diagram illustrating an embodiment of a first driving power voltage.

FIG. 5 is a diagram illustrating an embodiment of the first driving power voltage.

Referring to FIG. 5, the first driving power source may supply a predetermined driving current to the pixels PX, and accordingly be electrically connected to each of the pixels PX. When the first driving power source VDD1 supplies the predetermined driving current to the pixels PX, a predetermined voltage drop may occur in the first driving power source VDD1. In addition, when the first driving power source VDD1 is electrically connected to each of the pixels PX, noise corresponding to driving of each of the pixels PX may be transferred to the first driving power source VDD1.

In an embodiment, as shown in FIG. 5, the first driving power source VDD1 may not maintain a certain voltage but may vary corresponding to time. Therefore, when the first driving power source VDD1 is supplied to pixels to be sensed, a sensing voltage applied to the second node N2 of each of the pixels may be differently set corresponding to the voltage of the first driving power source VDD1. Although a specific pixel maintains the same characteristic, sensing data Sdata generated in a specific pixel may be differently set for each time, corresponding to the voltage of the first driving power source VDD1, and accordingly, the reliability of compensation may be deteriorated.

Figure 6:
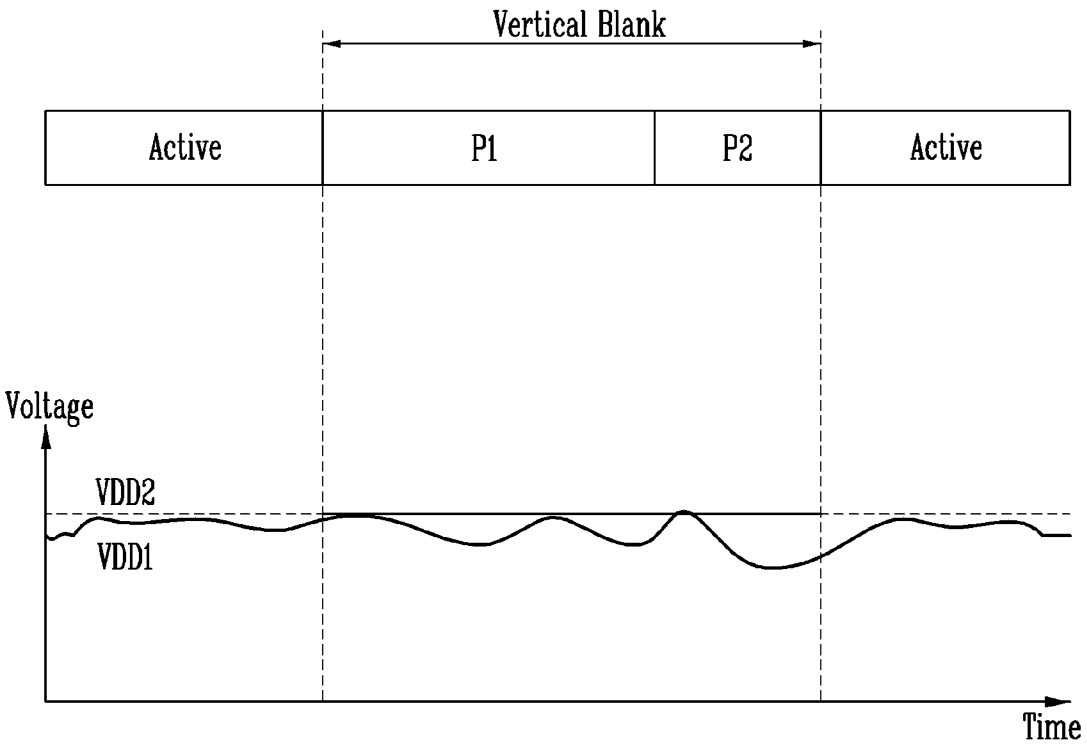
FIGS. 6 and 7 are diagrams illustrating an embodiment of a second driving power voltage.
Figure 7:
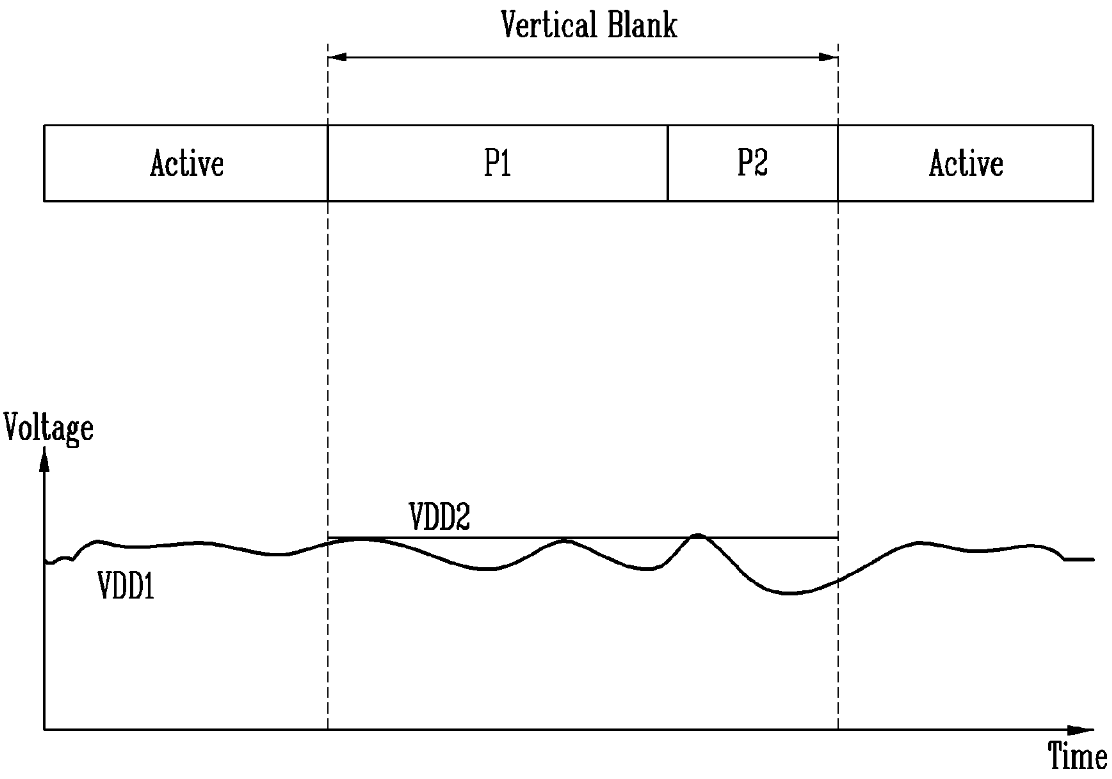

FIGS. 6 and 7 are diagrams illustrating an embodiment of the second driving power voltage.

Referring to FIG. 6, the voltage of the first driving power source VDD1 may vary corresponding to the time as described with reference to FIG. 5.

The second driving power source VDD2 may not supply any driving current to the pixels PX, and accordingly, a voltage drop can be minimized. In addition, the second driving power source VDD2 is connected to pixels located on at least one specific pixel row during the sensing period, and accordingly, noise from the pixels may be minimized.

As shown in FIG. 6, the second driving power source VDD2 may maintain a certain voltage, corresponding to time. Thus, when the second driving power source VDD2 is supplied to pixels to be sensed, a sensing voltage applied to the second node N2 of each of the pixels can accurately reflect a characteristic of the pixels. That is, in an embodiment of the disclosure, the second driving power source VDD2 is supplied to the pixels to be sensed, and accordingly, sensing data Sdata, on which the characteristic of the pixels is reflected, may be generated with improved accuracy.

In an embodiment, the power supply 16 may supply the voltage of the second driving power source VDD2 to the second power line PL2 during the display period and the sensing period as shown in FIG. 6. However, the second driving power source VDD2 is not supplied to the pixels PX during the display period, and accordingly, undesired power consumption may be caused.

In an embodiment, as shown in FIG. 7, the power supply 16 does not supply the voltage of the second driving power source VDD2 to the second power line PL2 during the display period (i.e., the second power line PL2 is set to a floating state during the display period), but may supply the voltage of the second driving power source VDD2 to the second power line PL2 only during the sensing period. Accordingly, power consumption caused by the second driving power source VDD2 can be minimized.

Figure 8A:
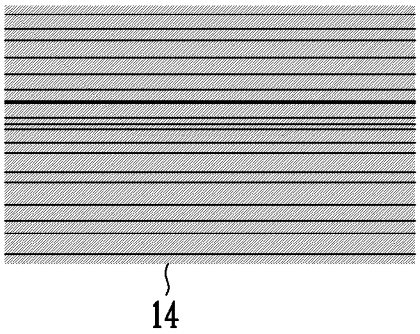
FIGS. 8A and 8B are diagrams illustrating an embodiment of an image displayed in the pixel unit when a first driving power source or a second driving power source is supplied during the sensing period.
Figure 8B:
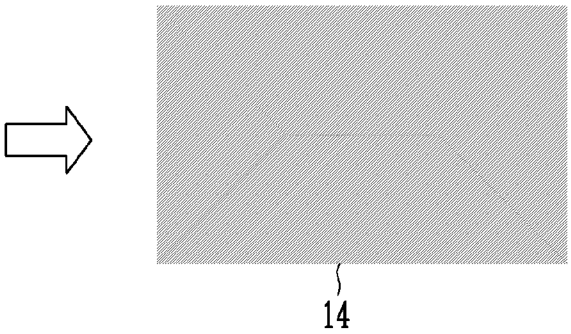

FIGS. 8A and 8B are diagrams illustrating an embodiment of an image displayed in the pixel unit when the first driving power source or the second driving power source is supplied during the sensing period. FIG. 8A illustrates a case where the first driving power source VDD1 is supplied during the sensing period, and FIG. 8B illustrates a case where the second driving power source VDD2 is supplied during the sensing period.

Referring to FIG. 8A, when the first driving power source VDD1 is supplied during the sensing period, a deviation may occur in sensing data Sdata, corresponding to a voltage change of the first driving power source VDD1. Although a same data signal is supplied to the pixels included in the pixel unit 14, an image in the form of horizontal lines may be displayed on the pixel unit 14.

Referring to (FIG. 8B, when the second driving power source VDD2 is supplied during the sensing period, the second driving power source VDD2 maintains a certain voltage, and hence sensing data Sdata on which only a characteristic of pixels is reflected may be generated. When a same data signal is supplied to the pixels included in the pixel unit 14, a uniform image can be displayed on the pixel unit 14.

Figure 9:
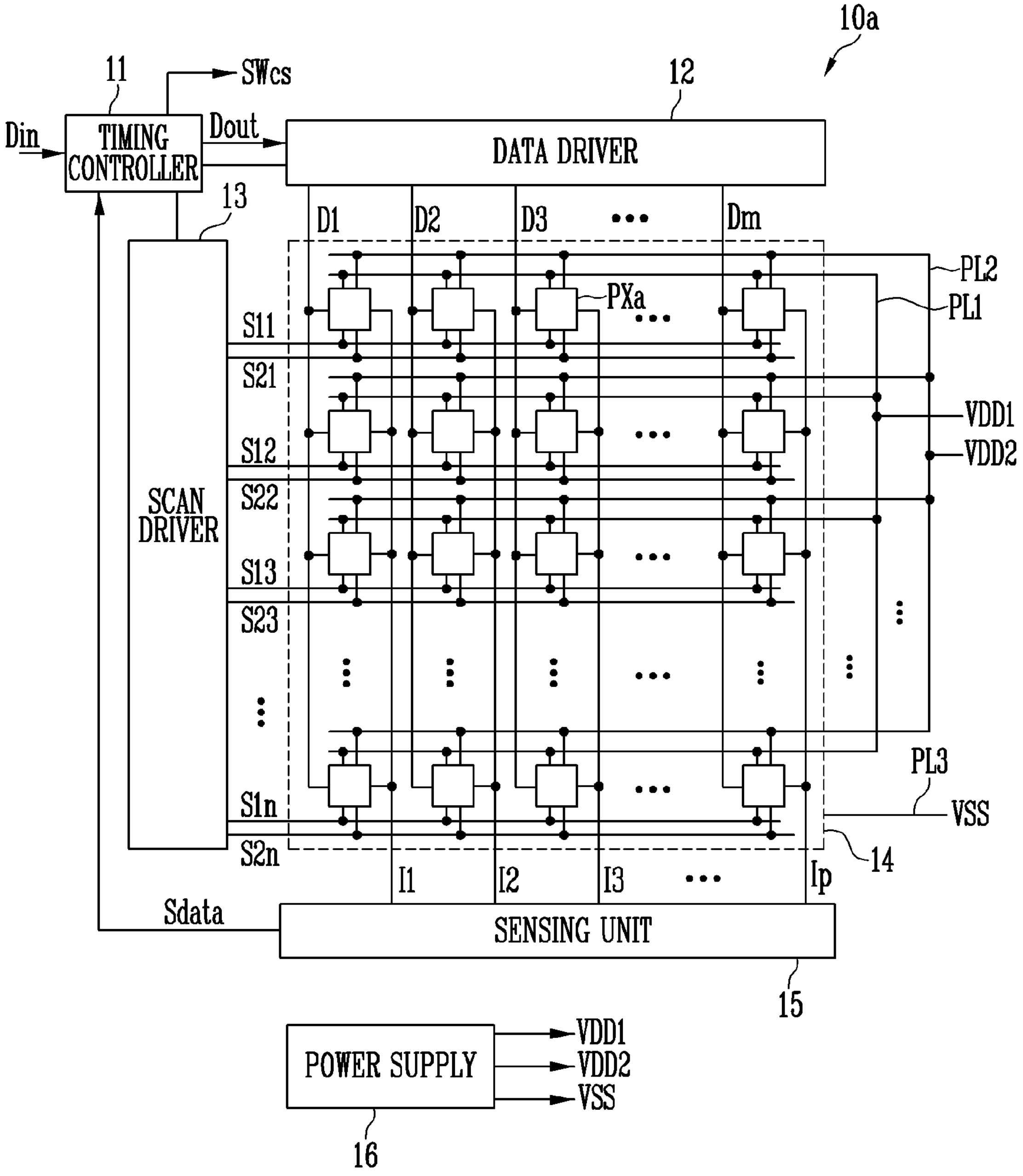
FIG. 9 is a diagram illustrating a display device in accordance with an embodiment of the disclosure.

FIG. 9 is a diagram illustrating a display device in accordance with an embodiment of the disclosure. In FIG. 9, components identical to those shown in FIG. 1 are denoted by like reference numerals, and any repetitive detailed descriptions thereof will be omitted.

Referring to FIG. 9, the display device 10*a* in accordance with an embodiment of the disclosure may include a timing controller 11, a data driver 12, a scan driver 13, a pixel unit 14, a sensing unit 15, and a power supply 16.

In such an embodiment, the power supply 16 may supply a first driving power source VDD1 to a first power line PL1, and supply a second driving power source VDD2 to a second power line PL2. Also, the power supply 16 may supply a third driving power source VSS to a third power line PL3. The first power line PL1, the second power line PL2, and the third power line PL3 may be commonly connected to pixels PXa.

The pixel unit 14 may include pixels PXa. Each of the pixels PXa may include a plurality of transistors and at least one light emitting element. Pixels PXa may be selected when a scan signal is supplied to a scan line connected thereto to be supplied with a data signal from a data line. Each of the pixels PXa supplied with the data signal may supply light with a predetermined luminance to the outside, corresponding to the data signal.

Each of the pixels PXa may include a plurality of switches. The switches may selectively connect the first power line PL1 or the second power line PL2 to a first transistor M1.

During a display period, the first transistor M1 of each of the pixels PXa may be connected to the first power line PL1. In an embodiment, for example, during the display period, the pixels PXa may be supplied with the first driving power source VDD1 via the first power line PL1.

During a sensing period, the first transistor M1 of each of pixels located on a pixel row, which are to be sensed, may be connected to the second power line PL2. In an embodiment, for example, during the sensing period, the pixels located on the pixel row, which are to be sensed, may be supplied with the second driving power source VDD2 via the second power source PL2.

Figure 10:
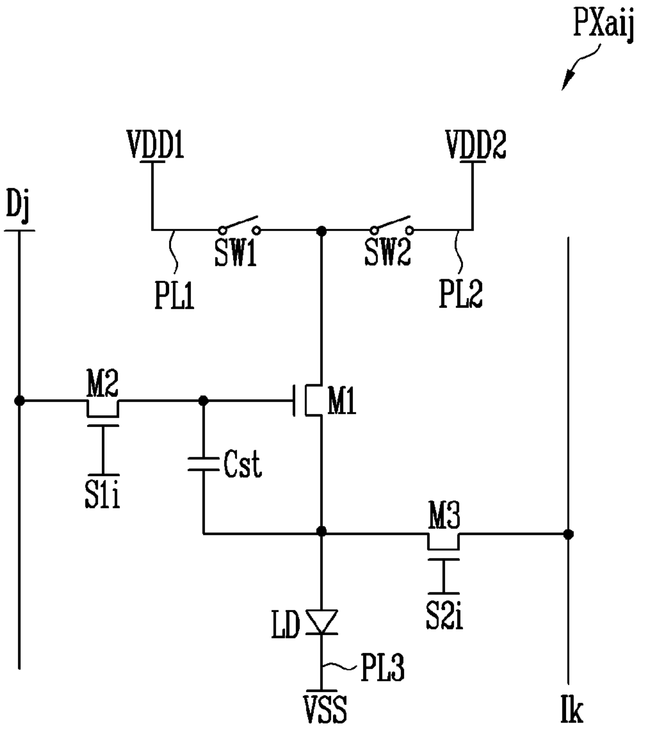
FIGS. 10 to 11B are diagrams illustrating an embodiment of a pixel shown in FIG. 9.
Figure 11A:
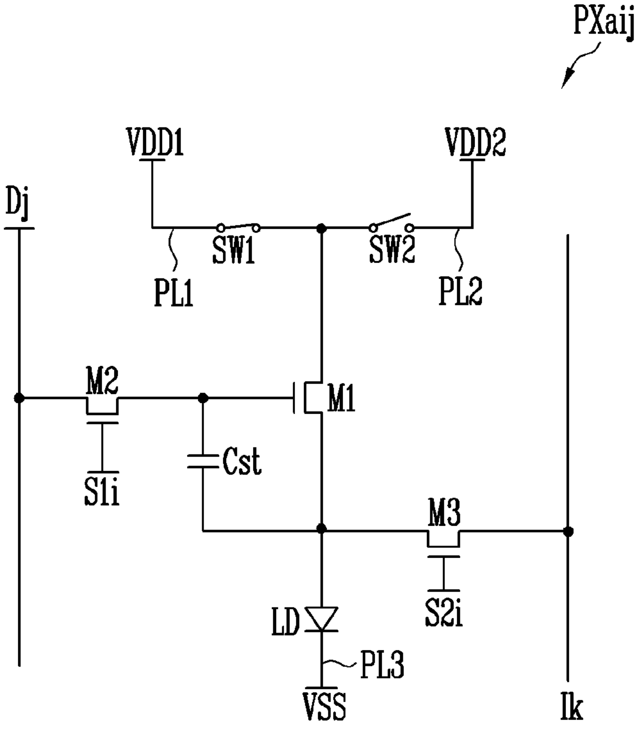
Figure 11B:
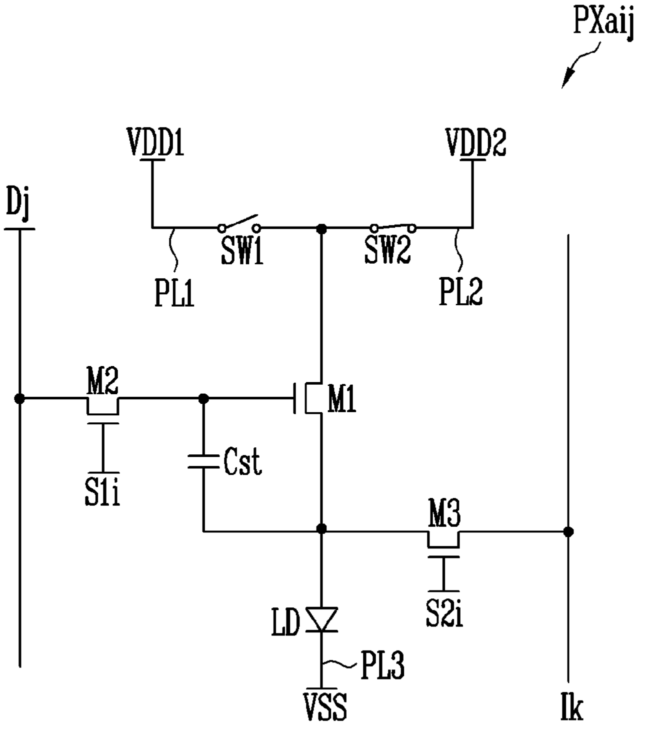

FIGS. 10 to 11B are diagrams illustrating an embodiment of the pixel shown in FIG. 9. In FIG. 10, detailed descriptions of portions overlapping with those shown in FIG. 2 will be omitted.

Referring to FIG. 10, a pixel PXaij in accordance with an embodiment of the disclosure may include transistors M1 to M3, a storage capacitor Cst, and a light emitting element LD. In such an embodiment, the pixel PXaij may include a first switch SW1 and a second switch SW2. The first switch SW1 and the second switch SW2 may be turned on or turned off by a switch control signal SWcs supplied from the timing controller 11. In an embodiment, the first switch SW1 and the second switch SW2 may be alternately turned on or turned off.

The first switch SW1 may be connected between the first power line PL1 and a first transistor M1. The first switch SW1 may be turned on during the display period as shown in FIG. 11A. When the first switch SW1 is turned on, the first power line PL1 may be electrically connected to the first transistor M1, and accordingly, the first transistor M1 may be driven by the first driving power source VDD1.

The second switch SW2 may be connected between the second power line PL2 and the first transistor M1. The second switch SW2 may be turned on during the sensing period as shown in FIG. 11B. When the second switch SW2 is turned on, the second power line PL2 may be electrically connected to the first transistor M1, and accordingly, the first transistor M1 may be driven by the second driving power source VDD2.

Additionally, during the sensing period, the second switch SW2 included in each of pixels located on a pixel row, which are to be sensed, may be turned on. The second switch SW2 included in each of pixels located on a pixel row, which are not to be sensed, may be set to a turn-off state (i.e., the first switch SW1 is set to the turn-on state), and accordingly, the pixels located on the pixel row, which are not to be sensed, may display a predetermined image, corresponding to a data signal.

In the display device and the method of driving the display device in accordance with the disclosure, a first driving power source may be supplied to pixels during a display period, and a second driving power source may be supplied to the pixels during a sensing period. The second driving power source is set to a power source for maintaining a constant voltage, and accordingly, sensing data having high reliability can be generated during the sensing period.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
pixels connected to scan lines, data lines, and sensing lines;
a power supply which supplies a first driving power source to a first power line, supplies a second driving power source to a second power line, and supplies a third driving power source to a third power line;
first switches located on pixel rows, respectively; and
second switches located on the pixel rows, respectively,
wherein a first switch located on an i-th pixel row among the first switches is connected between pixels located on the i-th pixel row and the first power line, and a second switch located on the i-th pixel row among the second switches is connected between the pixels located on the i-th pixel row and the second power line,
wherein i is a natural number,
wherein the first switch and the second switch, which are located on the i-th pixel row, are alternately turned on and turned off;
wherein, during a display period, in which an image is displayed by the pixels, the first switches are turned on, and the second switches are turned off; and
wherein, during a sensing period, in which the pixels located on the i-th pixel row are sensed, the first switch located on the i-th pixel row is turned off, and the second switch located on the i-th pixel row is turned on, the sensing period including a first period, in which sensing data is sensed corresponding to a sensing voltage from the pixels located on the i-th pixel row, and including a second period, in which a data signal before the sensing period is re-supplied.

2. The display device of claim 1, wherein the display period is an active period included in one frame period.

3. The display device of claim 1, wherein the power supply supplies the second driving power source to the second power line during the sensing period, and sets the second power line to a floating state during the display period.

4. The display device of claim 1, wherein, during the sensing period, in which the pixels located on the i-th pixel row are sensed, first switches located on the other pixel rows except the i-th pixel row are in a turn-on state, and second switches located on the other pixel rows are in a turn-off state.

5. The display device claim 1, wherein the sensing period is a vertical blank period included in one frame period.

6. The display device claim 1, further comprising:

a data driver which supplies a data signal to the data lines during the display period, and supplies a voltage of a reference power source to the data lines during the sensing period;

a scan driver which supplies a scan signal to the scan lines;

a sensing unit connected to sensing lines, wherein the sensing unit generates sensing data, corresponding to a sensing voltage supplied from the pixels located on the i-th pixel row during the sensing period, in which the pixels located on the i-th pixel row are sensed; and a timing controller which generates output data by correcting input data from an outside, using the sensing data.

7. The display device of claim 6, wherein the timing controller controls turn-on and turn-off of the first switches and the second switches using a switch control signal supplied thereto.

8. A display device comprising:

pixels connected to scan lines, data lines, and sensing lines, wherein each of the pixels includes a first switch and a second switch; and a power supply which supplies a first driving power source to a first power line, supplies a second driving power source to a second power line, and supplies a third driving power source to a third power line, wherein the first switch included in each of the pixels is connected to the first power line, and the second switch included in each of the pixels is connected to the second power line, wherein, during a display period, in which the pixels display an image, the first switch included in each of the pixels is in a turn-on state, and the second switch included in each of the pixels is in a turn-off state; and wherein, during a sensing period, in which the pixels located on the i-th pixel row are sensed, the first switch located on the i-th pixel row is turned off, and the second switch located on the i-th pixel row is turned on the sensing period including a first period, in which sensing data is sensed corresponding to a sensing voltage from the pixels located on the i-th pixel row, and including a second period, in which a data signal before the sensing period is re-supplied.

9. The display device of claim 8, wherein, during a sensing period in which pixels located on an i-th pixel row are sensed, the first switch included in each of pixels located on the i-th pixel row is in a turn-off state, and the second switch included in each of the pixels located on the i-th pixel row is in a turn-on state, wherein i is a natural number.

10. The display device of claim 9, wherein the display period is an active period included in one frame period, and the sensing period is a vertical blank period included in the one frame period.

11. The display device of claim 9, wherein the power supply supplies the second driving power source to the second power line during the sensing period, and sets the second power line to a floating state during the display period.

12. The display device of claim 9, further comprising:

a data driver which supplies a data signal to the data lines during the display period, and supplies a voltage of a reference power source to the data lines during the sensing period;

a scan driver which supplies a scan signal to the scan lines;

a sensing unit which generates sensing data, corresponding to a sensing voltage supplied from the pixels located on the i-th pixel row during the sensing period; and a timing controller which generates output data by correcting input data input from an outside, using the sensing data.

13. The display device of claim 12, wherein the timing controller controls turn-on and turn-off of the first switch and the second switch by supplying a switch control signal thereto.

14. A method of driving a display device, the method comprising:

supplying a voltage of a first driving power source to a driving transistor included in each of pixels via a first power line during a display period such that during the display period, a first switch included in each of the pixels is in a turn-on state, and a second switch included in each of the pixels is in a turn-off state; and supplying a voltage of a second driving power source different from the first driving power source to the driving transistor included in each of the pixels via a second power line during a sensing period; and during a sensing period, in which the pixels located on the i-th pixel row are sensed, turning off the first switch located on the i-th pixel row, and turning on the second switch located on the i-th pixel row the sensing period including a first period, in which sensing data is sensed corresponding to a sensing voltage from the pixels located on the i-th pixel row, and including a second period, in which a data signal before the sensing period is re-supplied.

15. The method of claim 14, wherein the second power line is set to a floating state during the display period.

16. The method of claim 14, wherein the display period is an active period included in one frame period, and the sensing period is a vertical blank period included in the one frame period.

17. The method of claim 14, further comprising:

generating output data by correcting input data, corresponding to sensing data generated from the pixels during the sensing period; and generating a data signal using the output data, and supplying the data signal to the pixels during the display period.

* * * * *